B. P. HAYES.
TELEGRAPH TRANSMITTER.
APPLICATION FILED MAY 17, 1910.
994,079.
Patented May 30, 1911.
5 SHEETS—SHEET 3.
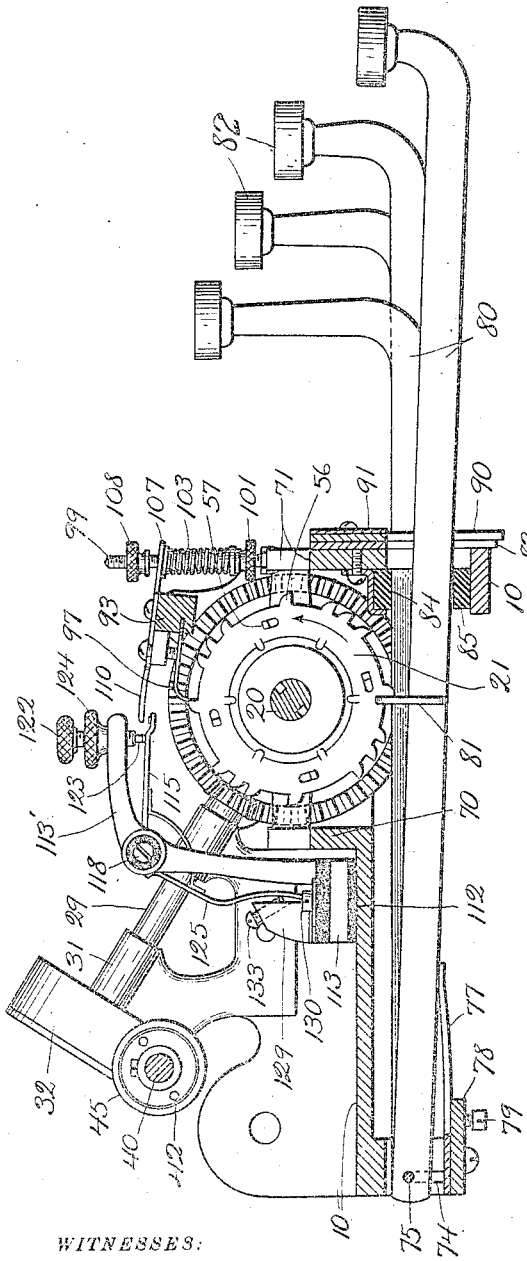
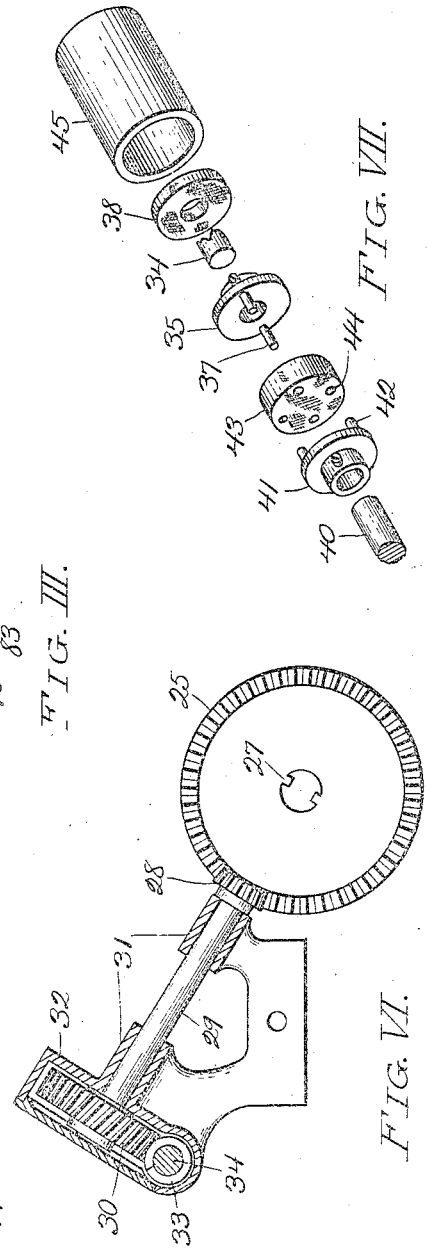
WITNESSES:
INVENTOR.
Benj. P. Hayes,
BY
ATTORNEY.

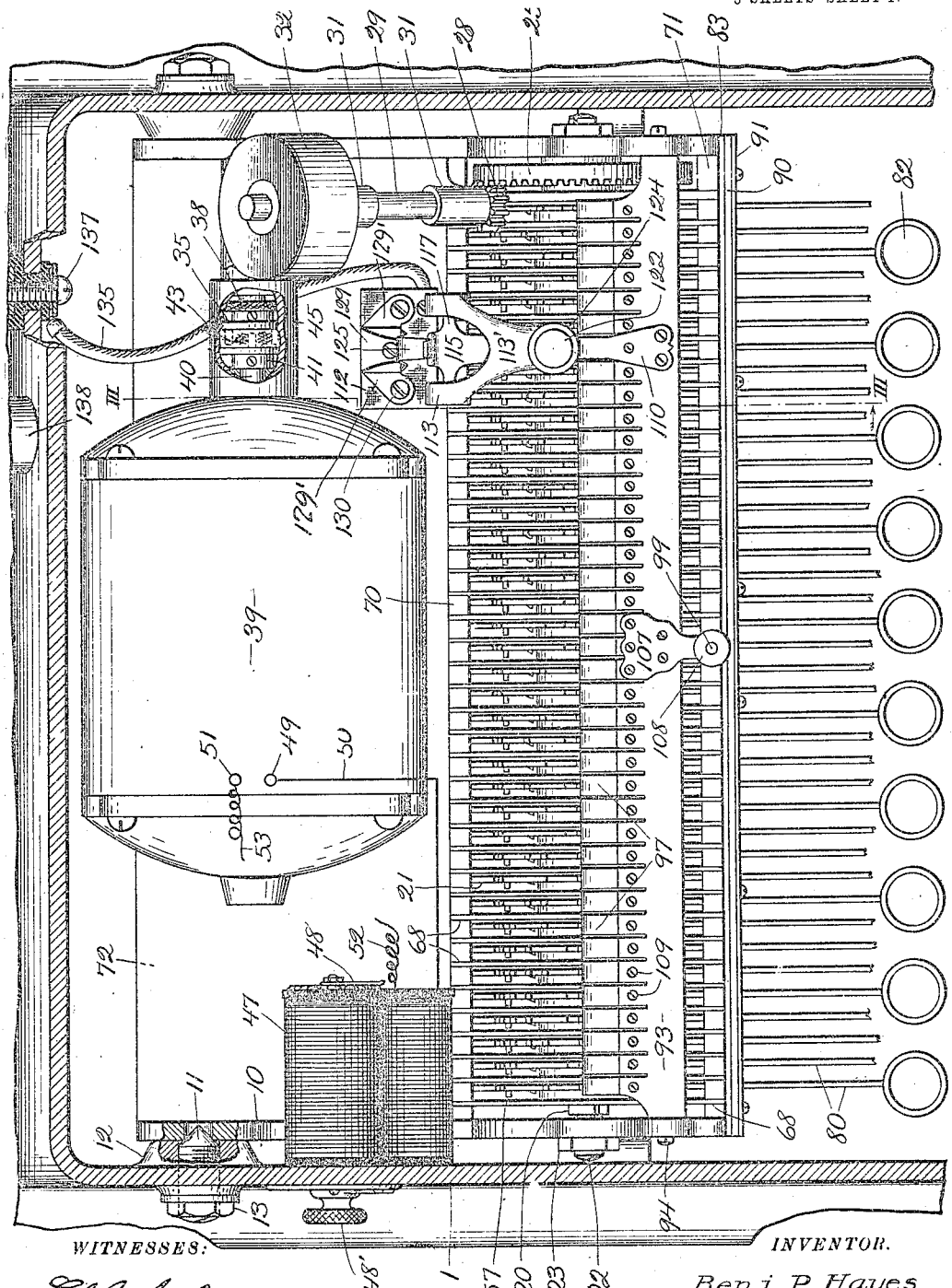
FIG. I

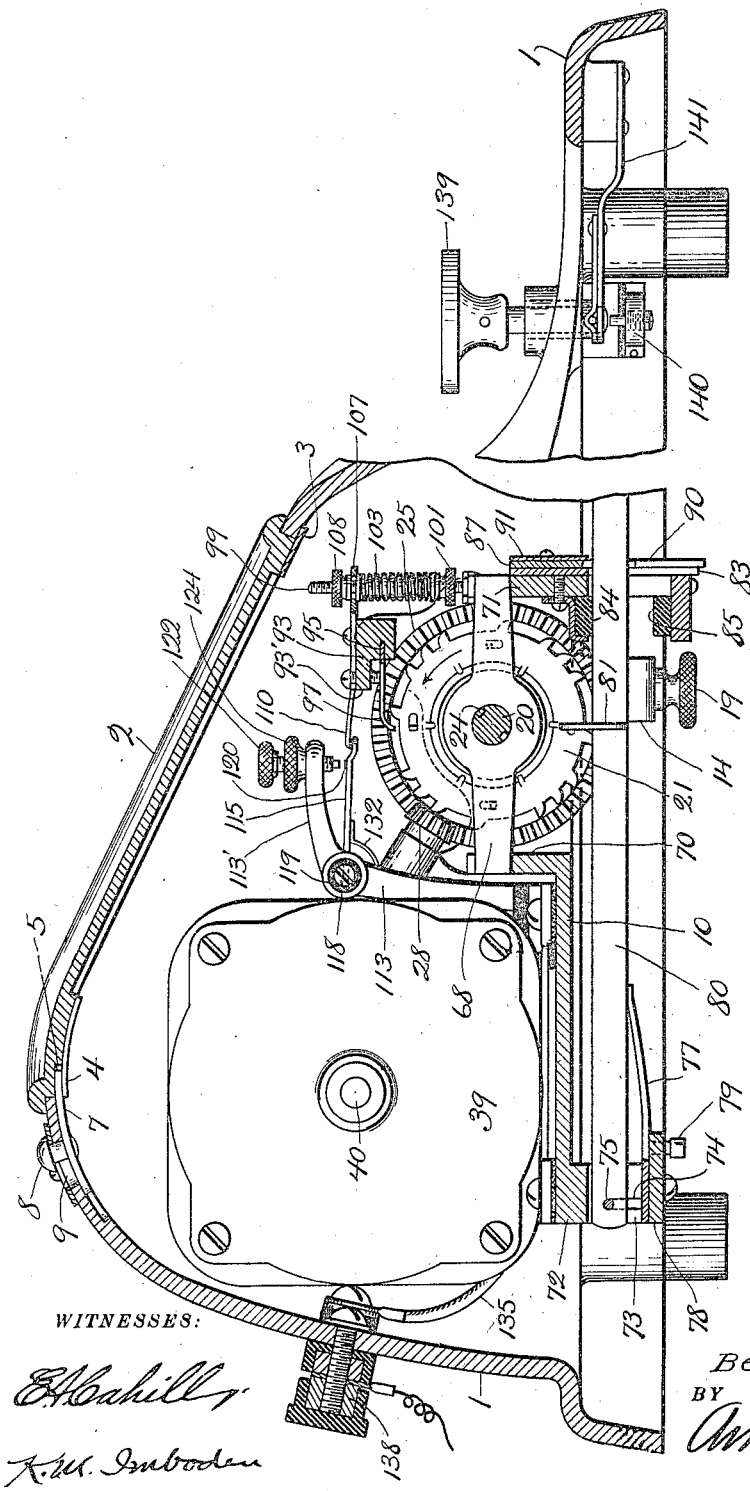

B. P. HAYES.
TELEGRAPH TRANSMITTER.
APPLICATION FILED MAY 17, 1910.
994,079.
Patented May 30, 1911.
5 SHEETS—SHEET 4.
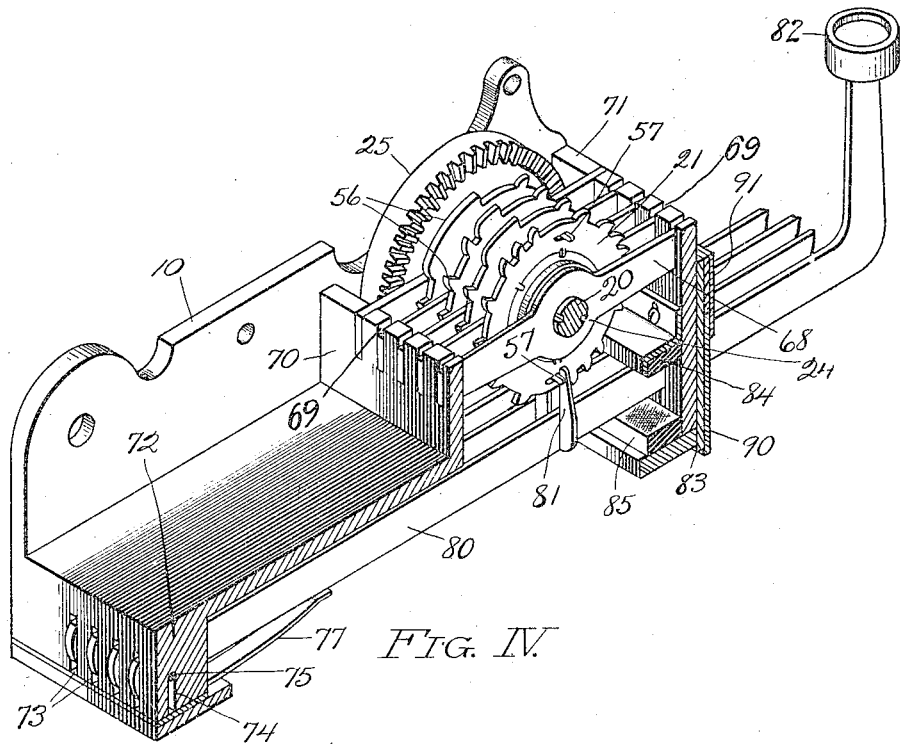
FIG. IV
FIG. V
WITNESSES:
INVENTOR.
Benj. P. Hayes,
BY
ATTORNEY.

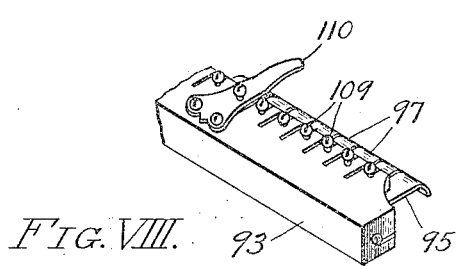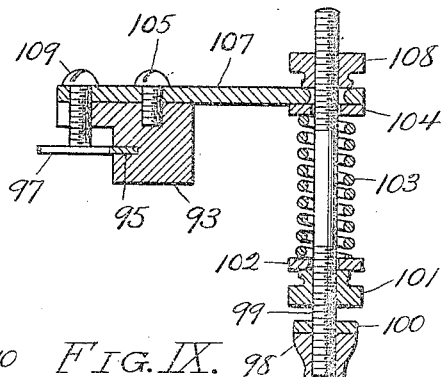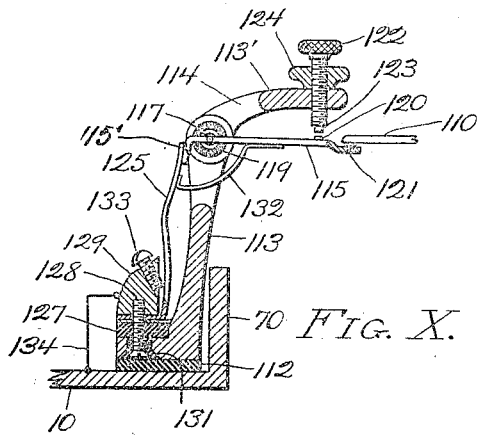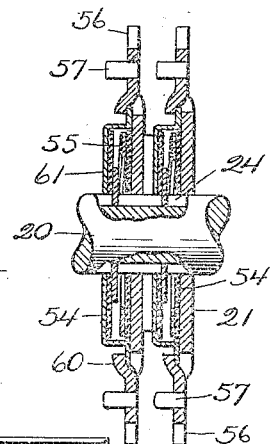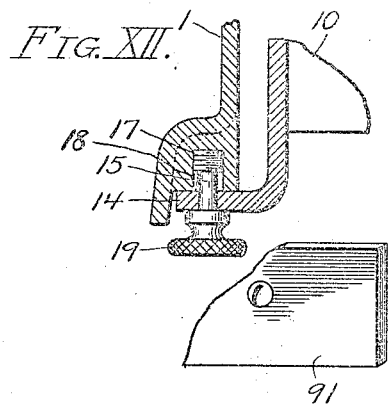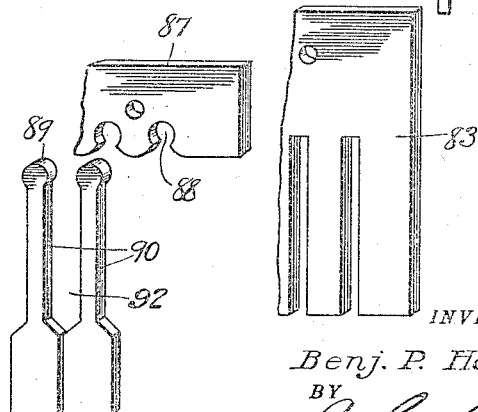

UNITED STATES PATENT OFFICE.

BENJAMIN P. HAYES, OF TOPEKA, KANSAS, ASSIGNOR TO THE AMERICAN TRANSMITTER AND MANUFACTURING COMPANY, OF TOPEKA, KANSAS, A CORPORATION OF KANSAS.

TELEGRAPH-TRANSMITTER.

994,079.

Specification of Letters Patent. Patented May 30, 1911.

Application filed May 17, 1910. Serial No. 561,790.

*To all whom it may concern:*

Be it known that I, BENJAMIN P. HAYES, a citizen of the United States, residing at Topeka, in the county of Shawnee and State of Kansas, have invented certain new and useful Improvements in Telegraph-Transmitters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to mechanical telegraph transmitters and has for its principal object to provide an automatic keyboard machine, by the use of which messages in the Morse code may be sent at substantial speed without nervous effort on the part of the operator.

A further object is to provide the improved details of construction hereinafter described, and illustrated in the accompanying drawings, in which:—

Figure I is a top plan view of a transmitter constructed according to my invention; some of the key levers being broken away, and the case being broken away and in section. Fig. II is a vertical sectional view of the transmitter, a portion thereof being broken out. Fig. III is a vertical section taken approximately on line III—III of Fig. I, showing the electrical contact in closed position and one of the keys depressed. Fig. IV is a sectional perspective view of several of the code disks, their bearings and key levers, the frame, and certain other parts. Fig. V is a disassembled perspective view of one of the code disks with its friction drive parts. Fig. VI is a detail view of the transmission gearing, the bearing and housing, in section. Fig. VII is a disassembled perspective view of the coupling between the motor shaft and the transmission gear. Fig. VIII is a perspective view of a portion of the comb rocker and comb, with the key opener. Fig. IX is a sectional detail view of the tension adjusting device for the comb rocker. Fig. X is a sectional detail view of the circuit closer and its tension adjusting device. Fig. XI is a sectional detail view of two of the code disks, and a portion of their shaft. Fig. XII is a sectional detail view showing one of the frame retaining screws. Fig. XIII is a disassembled perspective view of several members of the automatic key-locking mechanisms, the key levers being omitted.

Referring more in detail to the parts:— 1 designates the case which incloses and protects the working parts, (except the keys) from dust and injury. The top of the case is provided with a removable cover 2, which has a lug 3 that engages the case as shown, also a lug 4, above which is a socket 5, adapted to receive a latch 7 mounted in the case. Latch 7 has a headed stem 8, passing through a slot 9, by which stem the latch is guided and supported. When the latch is withdrawn the cover 2 may be removed to provide access to the top of the mechanism.

10 designates the frame upon which the mechanism is mounted, the structure of this frame being clearly shown by the drawings. The rear of the frame is pivotally mounted upon two conical-pointed screws 11 which pass through bosses 12 on the case 1 and are provided with lock-nuts 13. At its forward, lower corners, the frame is provided with laterally projecting lugs 14, each having an opening through which passes the shank 15 of a frame retaining screw 17, to receive which a hole 18 is tapped in the case as shown in Fig. XII. When the heads 19 of screws 17 are tightened upon the lugs 14, the frame 10 is held rigidly in its normal position. When it is desired to expose the entire mechanism for inspection or cleaning, the screws 17 are withdrawn from engagement with the case, and the latter is turned rearwardly upon the pivots 11, while the mechanism will be supported at the rear by said pivots and in front by the table upon which the transmitter rests.

20 designates a shaft upon which are mounted the character disks 21, to be presently described. In the ends of this shaft are sockets such as are made by lathe centers, and the shaft is rotatably supported by conical pointed screws 22, which enter said sockets, said screws being provided with lock-nuts 23 for holding same in position.

24 designates grooves which are cut the full length of said shaft on opposite sides thereof. On one end of the shaft is a gear wheel 25, whose shaft opening has inward projections 27 fitting within the shaft grooves 24. Meshing with the gear 25 is a pinion 28, on an inclined shaft 29, on which is also fixed a worm gear wheel 30. The bearings 31 of shaft 29 are integral with a housing 32 which incloses the gear 30 and also the worm 33 which drives said gear and is fixed upon a shaft 34, a portion of which is shown in Fig. VII. Fixed upon this shaft 34 is a coupling head 35, having two or more projecting pins 37. A felt washer 38 is fitted on the shaft 34 behind the member 35.

39 designates an electric motor, whose shaft 40 is in alinement with the shaft 34 just mentioned. Fixed upon the motor shaft is a coupling head 41, having two or more projecting pins 42. Fitting between heads 35 and 41, is a disk 43, which is preferably of non-conductive material and has perforations 44 into which the pins 37 and 42 project. The entire coupling just described, is inclosed in a tube 45 of non-conductive material whose bore fits the periphery of the felt washer 38.

47 designates a rheostat, having a movable element 48, the purpose being to provide self-contained means for governing the speed of the motor. From terminal 49 of the motor, a wire 50 leads to the rheostat, and from the rheostat and motor terminal 51 respectively, wires 52, 53 lead to points of connection, not shown. The motor is wound for such voltages as are standard in incandescent electric lighting. By turning the knob 48', the motor may be started and stopped as well as having its speed regulated.

Describing next the character disks, with reference to Figs. II, V and XI: each disk comprises the disk proper, designated 21, having a central opening 58 that fits the shaft and an attached friction drive, designated 54—55. The disk proper is formed with peripheral teeth 56, which are spaced in accordance with the Morse code for the character or letter appropriated to the disk. The character combination on the disk shown in Fig. V is repeated four times, so that one fourth of a revolution of the disk will transmit the character. Accordingly, the disk is provided with four equally spaced stops 57, projecting from one side thereof. One side of the disk is sunken, as shown at 59, and at the periphery of said depression are a plurality of small clenchers 60 which are struck up from the disk itself.

The friction device consists of the two washers 54, an interposed member 55, and a retaining cap 61. Member 55 is a circular disk of spring metal, having three laterally bent tongues 62, which are cut free of the body 55 by incisions 63. The shaft opening 64 is formed with projections 65 which take into the shaft grooves, and thus key the member 55 to the shaft, though the member is slidable thereon to permit ready removal thereof. The parts are assembled by placing one of the washers 54 in the depression 59, then the member 55, then the other washer, and finally the cap 61, which has a flange 67 that fits within the margin of said depression. The clenchers 60 are then struck inwardly over the flange 67, securing the cap 61 to the disk 21. It will be evident that the spring tongues 62 will exert friction upon the washers 54, and the latter, upon the character disk 21 and cap 61; also that this construction is extremely compact so that the total number of character disks may be placed upon a single shaft of no great length.

Between each two disks 21, is a spacer 68, the ends of which are seated in grooves 69 in upright portions 70 and 71 of the frame. At the rear of said frame is a depending, thickened portion 72, into which are cut grooves 73 for the reception of the ends of the key-levers. Also cut into said part 72 is a transverse groove 74, through which passes a rod or wire 75 on which all of the key-levers are pivoted.

Secured to the bottom of frame part 72 are a series of springs 77, which bear upwardly on the key levers, there being a separate spring for each key lever. Also secured to said part 72, beneath the springs 77, is a transverse bar 78, through which extend vertical set-screws 79 that bear upon the respective springs 77. It is obvious that the pressure or "tension" of the springs may be increased by manipulation of these screws.

Mounted on each key lever 80 is an upwardly extending trip 81, which normally stands in the path of each of the stops 57, thereby preventing rotation of the character disk though the shaft 20 be in continuous rotation. When a key 82 is depressed, the trip 81 thereof releases the stop 57, and the disk 21 is turned by friction until the trip 81 is permitted to rise.

83 designates a plate which is secured to the front frame section 71 and has slots through which the key levers are extended. Also secured to the frame section 71 are the buffers 84—85, which limit the upward and downward motion of the key levers.

Secured to the front face of plate 83 is a bar or plate 87, in the lower edge of which are a series of sockets 88, equal in number to and equally spaced with the key-levers. Loosely mounted in sockets 88 are the heads 89 of depending interlock members, 90. An outside plate 91 is secured to plate 87, retaining the upper ends of the members 90 in place. The spaces 92 between the members 90 are alined with the key-levers, and the members 90 are so dimensioned that the total space between them, is only sufficient to permit one key-lever at a time to be depressed to a full stroke. As this device is not herein claimed, I do not deem it necessary to disclose same with elaboration.

Referring to Figs. I and II, 93 designates a rocker bar which extends above the code disks 21 and parallel to their shaft 20, the ends of said rocker bar being pivotally mounted on pointed set-screws 94, in the frame 10. The rearward face of the rocker bar 93 is grooved out to receive the forward edge of a comb 95, which is stamped from sheet metal of proper gage. Said comb consists of a number of fingers 97 which may properly be termed wipers as they make wiping contact with the projections 56 of the respective character disks when the latter are rotated. The wipers 97 are inflexible, so that when any one thereof is lifted by a projection 56, the rocker-bar 93 will turn on its pivots. Normally the ends of the wipers 97 stand in the path of said projections, as shown in Fig. II. Neither the comb 95 nor the disks 21 are electrically connected to the telegraphic circuit. The comb 95 is tensioned downwardly by a spring, which may be applied thereto in various ways, a preferred device for the purpose being shown in Fig. IX, and constructed as follows:—Cast on the frame section 71, is a boss 98, into which is screwed a vertical post 99, having a lock-nut 100. 101 designates a thumb-nut, and 102 a washer, above which is a helical spring 103 bearing a washer 104. Secured to the rock-bar 93 with screws 105, is a rigid arm 107 having a circular opening which loosely surrounds the post 99 above the washer 104. Threaded on the post, above the arm 107, is a thumb-nut 108. The spring 103 restores the rocker-bar and comb to normal position after each actuation of the latter. The function of the lower nut 101 is for adjusting the pressure of the spring 103 on the arm 107, while the function of the upper nut 108 is for adjusting the "touch" between the comb points and the code-disk projections. A very light "touch" is desirable, and the nut 108 should be adjusted accordingly. The rocker-bar 93 is provided with a flange 93' through which pass a series of set-screws 109 that are arranged above the respective comb fingers 97 and are adapted for engagement with said fingers to adjust same in relation to the character disks.

Secured to the rocker-bar 93 is a rearwardly extending finger 110, which operates the circuit maker and breaker to be now described.

Mounted on the frame 10 is an insulating plate 112, and mounted on said plate is a standard 113 having a forwardly projecting upper part 113'. In the standard is an opening 114 adapted for the reception of the vibratory contact finger 115. Said finger is provided with trunnions 117 which are pivoted on pointed screws 118, passing through insulating bushings 119 mounted in the standard. The finger 115 carries a platinum or like contact point 120, near its end; and at its end it carries an insulation button 121 which is located beneath the rockbar finger 110.

122 designates a set-screw, bearing a platinum or like point 123, directly above the point 120, and 124 designates a lock-nut for the screw 122.

The rearward end of the finger 115 is bent downwardly, as shown at 115'. Contacting this part is the upper end of a spring or resilient member 125, the lower end of which is secured to a piece of insulation 127 by means of a screw 128 and a metal block 129 into which the screw 128 threads. The piece 127 is rigidly secured to the standard 113 by the screw 128, the lower part of which is surrounded by a conical insulating washer 131. The spring 125 is thus insulated from the metal of the standard 113. The block 129 is provided with base lugs 129' which are secured to insulation 127 by screws 130.

Soldered to both the finger 115 and the spring 125 is a curved metallic strip 132, the function of which is to reliably conduct the current between said parts 115 and 125.

Threaded obliquely through the block 129 is an adjusting screw 133, whose end touches the lower part of the spring 125. It will be seen that a very slight downward movement of said screw 133 will cause the contact point 120 to approach the upper contact point 123. By this means the amplitude of vibration of the point 120 may be precisely adjusted. In this connection I will state that the circuit can be broken to any distance up to $\frac{1}{32}$ of an inch, (which is several times the opening of a hand key) making it possible to operate directly on lines with much higher voltage than is practicable with hand keys.

The metal block 129 is connected electrically to the frame 10 in any suitable manner, such connection being indicated conventionally at 134, Fig. X. The metal standard 113 is connected by a wire 135 to a binding post 137 on the casing 1. 138 designates a binding post which is grounded on said casing and therefore provides connection with the contact finger 115, through screw 133 and spring 125.

The keys 82 bear respectively the letters of the alphabet, numerals, and punctuation marks. Telegraphic abbreviations may also be appropriated to certain keys.

When the motor 39 is started the shaft 20 is continuously rotated in the direction of the arrow and continuously rotates all of the disk friction devices 54—55, the character disks 21 being all normally held against rotation by the raised trips 81 on the key-levers 80. The instant a key is depressed, its trip 81 disengages a disk stop 57 and the relative character disk is turned, its points 56 actuating the wipers 97 and rocker-bar 93, and lifting the arm 110, which normally holds the contact finger 115 depressed. Said finger moves its point 120 into contact with point 123 as each disk projection 56 lifts a wiper 97, and falls as such projection passes from beneath the wiper. Should the operator desire to repeat the letter or figure, the key is held depressed so that the character disk will have time to carry two or more characters beneath the wiper. If only one letter is to be transmitted, the key should be quickly released, so that the trip 81 will rise and arrest the motion of the disk by engaging the disk stop 57. It is apparent that the speed of transmission is governed by the speed of the motor.

139 designates the finger piece of a hand key 140, which is held upwardly by a spring 141 and is operated in the same manner as ordinary "Morse" keys. This key is connected in shunt with the mechanical key points 120 and 123, and its chief utility is for holding the circuit closed when the transmitter is not in operation, this function being the same as that of the switch of an ordinary Morse key.

Having thus described my invention, what I claim as new therein and desire to secure by Letters-Patent is:—

1. In a transmitter, a shaft, means for continuously rotating same, a character disk upon the shaft, said disk being provided with a stop and character projections, a key-lever normally engaging said stop, an oscillatory member adjacent said disk, a wiper held by said member and adapted for actuation by said character projections, a movable contact member, a member held by said oscillatory member and normally holding said contact member in open-circuit position, and a spring for moving said contact member to closed-circuit position when the member held by the oscillatory member is disengaged therefrom.

2. In a transmitter, a shaft, means for continuously rotating same, a character disk upon the shaft, said disk being provided with a stop and character projections, a key-lever normally engaging said stop, an oscillatory member adjacent said disk, a wiper held by said member and adapted for actuation by said character projections, a movable contact member mounted pivotally beneath a fixed contact member, a spring adapted to move the first named contact member to closed circuit position, an arm held by said oscillatory member and normally resting upon said movable contact member and holding same in open-circuit position; said arm being lifted by engagement of said wiper by a character disk projection.

3. In a transmitter, a rocker-bar, a wiper comb held thereby, members 110 and 107, mounted on said rocker-bar, member 107 having an opening therein, a threaded post passing freely through said opening, a spring upon said post below said member 107, and an adjusting nut on said post above and bearing upon said member.

4. In a transmitter, a rocker-bar, a wiper comb held thereby, members 110 and 107, mounted on said rocker-bar, member 107 having an opening therein, a threaded post passing freely through said opening, an adjusting nut on said post, a helical spring supported by said nut and bearing upwardly upon said member 107, and an adjusting nut on said post above said member and bearing thereupon.

5. In a transmitter, a rocker-bar, a wiper comb held thereby, a series of character disks having projections for actuating said comb, a spring tensioning said comb toward said disks, means for adjusting the comb relatively to said disks, and means for adjusting the pressure of said spring.

6. In a transmitter contact device, a standard, having an opening therein, a contact finger pivotally mounted in said opening, a closing spring engaging said finger, and a permanent electrical connection between said finger and said spring.

7. In a transmitter contact device, a standard, a contact finger pivotally mounted on the standard, a flat spring having its lower end secured to but insulated from the standard, said spring extending upwardly and its upper end engaging a bent end of said contact finger, for moving said finger to circuit-closing position, and a stop secured to said finger and contacting said spring.

8. In a transmitter contact device, a standard, having an opening therein, a contact finger pivotally mounted in said opening, a closing spring engaging said finger, and a permanent electrical connection between said finger and said spring, and a set-screw contacting said spring for adjusting the pressure of the spring upon said arm.

9. In a transmitter, a character disk shaft, a gear on said shaft, a worm shaft, gearing between the latter and the character disk shaft, a coupling head on the worm shaft, provided with projecting pins, an electric motor having a shaft, a coupling head on the motor shaft, provided with projecting pins, a disk having perforations which receive the pins of both coupling heads, and a tube inclosing said coupling parts.

10. In a transmitter, a casing, a character disk shaft, a gear on said shaft, a worm shaft, gearing between the worm shaft and the character disk shaft, a coupling head on the worm shaft, provided with projecting pins, an electric motor insulated from said casing, a shaft for said motor, a coupling head on the motor shaft, provided with projecting pins, an insulating disk having perforations which receive the pins of both coupling heads, and a tube of insulating material inclosing said coupling parts.

11. In a transmitter, a shaft having a key-way, a character disk loosely mounted on the shaft and having a depression in one of its faces, a cap secured to the face of said character disk, and having a depressed face coöperating with the depressed face of the character disk to form a chamber, a spring washer keyed on the shaft within said chamber, said washer having its body portion slit at regular intervals to form tongues, and said tongue being offset to lie in a plane parallel to the plane of said body portion, and friction washers lying between the spring washer and the character disk and between the spring washer and the cap, substantially as specified.

In testimony whereof I affix my signature in presence of two witnesses.

BENJAMIN P. HAYES.

Witnesses:
    EDWIN H. PETERSON,
    C. D. WELLMAN.